United States Patent [19]

Goldberg

[11] Patent Number: 4,869,363
[45] Date of Patent: Sep. 26, 1989

[54] COMBINATION MODULE COVER AND CATENARY HOLD DOWN

[76] Inventor: Melvin S. Goldberg, 210 Las Palmas Dr., Santa Barbara, Calif. 93110

[21] Appl. No.: 314,563

[22] Filed: Feb. 23, 1989

[51] Int. Cl.$^4$ ...................... B65D 71/06; B65D 71/00
[52] U.S. Cl. ......................................... 206/83.5; 52/5; 150/154
[58] Field of Search .................. 206/83.5, 442; 52/3, 52/5; 150/154

[56] References Cited

U.S. PATENT DOCUMENTS

| | | | |
|---|---|---|---|
| 4,221,085 | 9/1980 | Conaghan | 150/154 |
| 4,538,385 | 9/1985 | Kanbarian | 206/83.5 |
| 4,781,291 | 11/1988 | Van Ginhoven | 206/83.5 |

Primary Examiner—Stephen Marcus
Assistant Examiner—Jacob Ackon, Jr.
Attorney, Agent, or Firm—Harry W. Brelsford

[57] ABSTRACT

A waterproof fabric cover is placed over the top of a cotton module which is a stack of compressed raw cotton having a rectangular horizontal cross section. The cover typically covers only the upper half of the module and frequently only the upper quarter or upper eighth. The cover has side walls longer than the end walls and these long side walls need hold down structures to hold the cover on the module during high winds. Secured to the bottom edge of the side walls are loops that are shorter in the center of the side wall and longer on each side of the center loop. The bottom ends of these loops define points on a catenary curve. A girth cord is passed through the loops and around the ends of the module at a level below the loops to define an approximate catenary curve along the side walls.

9 Claims, 2 Drawing Sheets

COMBINATION MODULE COVER AND CATENARY HOLD DOWN

This invention relates to covers for cotton modules and has particular reference to a combination of a cover and a catenary hold down strap or rope for the cover.

BACKGROUND OF THE INVENTION

It is current practice in the cotton growing areas of United States to compact the raw picked cotton in the field by compressing the cotton into portable molds. The picked cotton is dumped into the open top of the molds and is lightly compacted compared to the compaction of cotton in a cotton bale. When the compaction is completed, the mold is removed and a rectangular mass of cotton remains which is referred to as a cotton module. The size is generally standardized at either 32 or 36 feet in length with a height of 8 to 10 feet and tapered sidewall that are 7 feet to 8 feet apart at the top of the module.

The purpose of the modules is to store raw cotton until such time as ginning capacity is available. The modules frequently are left in the field for many weeks or months until such time as they are picked up and transported to the gin. During this time period they are exposed to rain and wind and a waterproof cover is needed to protect the module from rain and also to secure the top from blowing away in the wind. The waterproof cover preferably must be secured to withstand winds in the range of 50 mph to 60 miles per hour that occur especially in the semiarid regions where irrigation is used. The cover protects the cotton module from wind erosion as the modules are transported on high speed vehicles.

While protecting the top from wind erosion is usually sufficient to eliminate wind loss, some covers are equipped with mesh sides that depend from the bottom edge of the waterproof portion of the cover to prevent side wall erosion. These mesh sides also allow the module to "breathe" or be ventilated.

Various schemes have been used to secure the cover to the module to prevent blowing off in the wind. Metal spikes and hooks have been driven into the sides and ends to which ropes are tied. These are generally not favored because of the chance that an overlooked spike or hook might enter the gin and damage it. Some modules are compacted with transverse ropes or webs disposed under the bottom of the module and up the sides so that the cover can be secured to the ends of these transverse ropes. Horizontal ropes have been used that are disposed in the bottom edge of the cover or the bottom edge of the mesh in covers using mesh. Also horizontal ropes have been tied around the module below the cover to which cover ropes are tied.

The amount of labor involved in securing a cover to a module is becoming critical and there is a need for a cover that is factory equipped with a tie down that is effective and that can be quickly attached to the module.

BRIEF SUMMARY OF THE INVENTION

I have discovered that a cover having a girth rope or cord in the shape of an inverted catenary curve on the sides of the module is the most effective combination for retention of the cover. The catenary curve is achieved by fixed loops extending downwardly depending from the cover and of such length that they define the catenary curve. Instead of round rope I prefer to use flat fabric straps that are generally referred to as webbing. The rope or webbing is disposed in the loops at the factory and is ready to use in the field by the most unskilled workers. The catenary curve gives effective tensioning over a major part of each sidewall of the cover.

BRIEF DESCRIPTION OF THE DRAWINGS

Referring to the drawings forming an integral part of this specification.

DETAILED DESCRIPTION

A catenary curve is the shape that a flexible cord of uniform density and thickness assumes when it hangs freely from two fixed points. These can be flat curves or deep curves depending upon the initial tension. This is the curve that cables on suspension bridges assume and this catenary curve is famous for supporting uniform loads through out its length. While the present invention does not utilize a mathematically perfect catenary curve, the substantial approximations of the catenary curve apply generally uniform pressure on the cover to hold it in place, especially at the center region where all other types of hold down structures are weak. The result is a cover that resists the highest winds generally expected.

Figure 1:
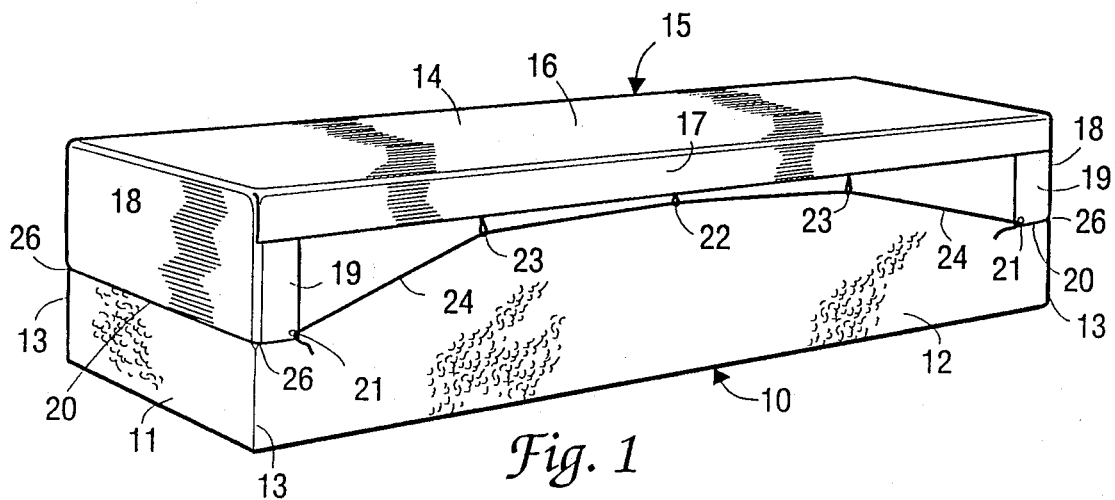
FIG. 1 is a three dimensional view of a cotton module on which is secured my new combination cover and hold down with waterproof ends.

Referring to FIG. 1 there is illustrated an elongated cotton module 10 having end walls 11 and side walls 12 that are much greater in horizontal dimension than the end walls 11. The side walls and end walls intersect to form four corners 13. The module has a top 14 that is generally horizontal.

Disposed on the top of the module is a cover 15 including a waterproof sheet 16 of the same general size as the module top. Secured to the long sides of the sheet 16 are waterproof side walls 17 that usually have a vertical dimension from one fifth to one eighth of the height of the module. Also secured to the sheet 16 are end walls 18 that have a vertical dimension several times that of the sidewalls 17. The end walls 18 may have a wrap-around flap 19 at each corner. Disposed in the outboard lower corner of each flap 19 is a grommet or buckle or loop 21.

While module covers have been made of plastic film, I prefer to use fabric material that has a waterproof coating and I presently prefer polyethylene fabric with a polyethylene water proof coating. This polyethylene material is extremely strong in tension and the hems especially can be used as ropes, belts or other cords to hold the cover to the module. The mesh used in side walls is comparatively weak and care must be used in attaching loops and the like when tension is applied to the mesh.

Referring to FIG. 1, secured to the bottom edge of the side walls 17 near their center is a loop 22 and toward the ends from this loop 22 are longer loops 23. Secured to each buckle 21 is a cord 24 that passes through the loops 22 and 23 and is manually tightened and tied off at one of the grommets 21 on each side of the module. The bottom of the loops define points along a catenary curve. The shape of the cord 24 of FIG. 1 is a modified catenary curve that is inverted from the usual concepts of catenary. This catenary cord 24 applies pressure not only at the outboard loops but at the, center loop 22 where the usual module covers lift up on even moderate winds. My catenary cords 24 however apply a full measure of tension to this center loop 22 to hold the cover in the strongest anticipated winds. The grommets 21 are disposed at a distance below the bottom of the loops 22 and 23 by an amount depending upon the winds to be encountered and I presently dispose the grommets 21 by a distance of 2 to 3 feet below the center loop 22 to hold the cover 15 in winds up to 60 miles per hour. The pull of the cord 24 on the grommets 21 creates a tension on a lower edge 20 of the end piece 18 and this edge is preferably hemmed. This edge 20 accepts tension like a rope and cuts into each corner 13 of the module at points 26. These depressed corners 26 serve as anchors for the cord 24 as well as for the bottom edge 20 of the end walls 18.

Figure 2:
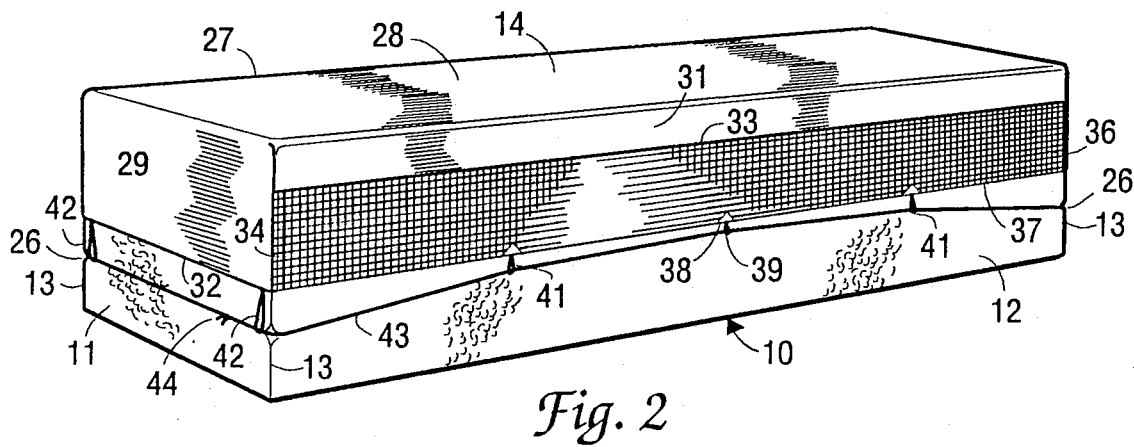
FIG. 2 is a three dimensional view of a modified form of waterproof cover with waterproof ends with mesh secured to the bottom edge of the cover side walls and to the end pieces, in combination with my catenary hold down holding the mesh and the end walls.

Referring to FIG. 2 the cotton module 10 has the side walls 12, end walls 11 that intersect the side walls 12 forming the corners 13. Fitted over the module 10 is a cover 27 having a top sheet 28 end walls 29 and side walls 31 of waterproof material. The end walls have a lower edge 32 and a vertical edge 34 which is preferably hemmed and the side walls have a lower horizontal edge 33. Secured to the lower edge 33 of the side walls 31 is a sheet of mesh 36 having a lower edge 37 at approximately the lower edge 32 of the end walls 29. Secured by serving or otherwise to the lower edge 37 of the mesh 36 are a plurality of triangular reinforcement 38 to which are secured a center loop 39 and longer outboard loops 41. Secured to the bottom edges 32 of the end walls 29 are even longer loops 42. Passing through the loops 39, 41 and 42 is a cord 43 which is manually tightened at one end suitably buckled or tied at 44. If webbing is used for the cord 43, I prefer to use a double bar buckle with a release tab. Such buckles hold against maximum tension but are easily released by lifting the tab.

The cord 43 bites into the module corners 13 by locally compressing the cotton at 26 thereby anchoring the cord at four points on the module. The end pieces 29 are held in place by the loops 42 and if desired a center loop can be attached to the end pieces. Again the cord 43 forms an inverted modified catenary shape that holds down the cover at the three points where loops 39 and 41 are located on the side walls. If the module is eight feet high, I prefer that the vertical dimension of side wall be about one foot to 18 inches and that the mesh vertical dimension be about three feet so that approximately the upper half of the module is enclosed. The mesh allows the module to breathe or ventilate while the top sheet 28, ends 29 and side walls give adequate rain protection. The mesh 36 catches any cotton that may work loose from the module.

Figure 3:
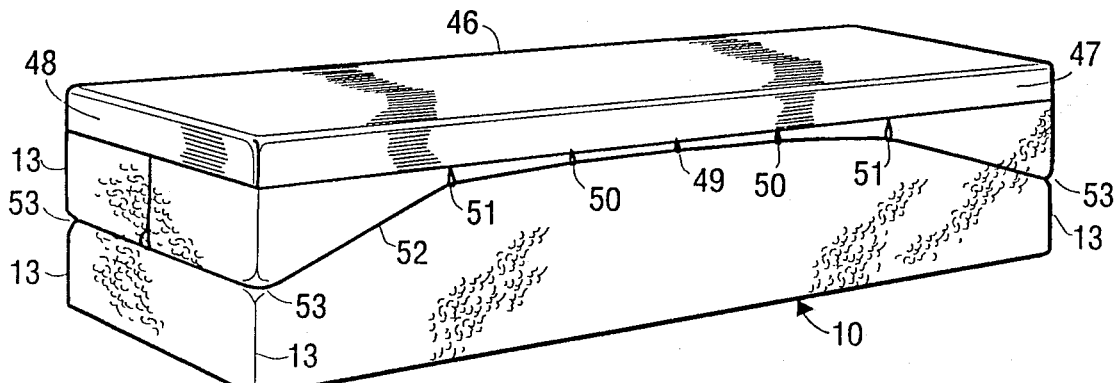
FIG. 3 is a three dimensional view of a modified cotton module having a cover with end walls of the same general dimension as the sidewalls with wall secured by my catenary hold down.

Referring the FIG. 3, there is illustrated a cover of the type sometimes referred to as a cap wherein the ends walls are of the same vertical dimension as the side walls. A top sheet 46 has side walls 47 and end walls 48 of approximately the same vertical dimension. Secured near the center quarter of each side wall 47 is a center loop 49 and two outboard longer loops 50. Longer loops 51 are outboard of these toward the quarter points of the side wall 47. A cord 52 passes through the loops 49, 50 and 51 to bite into the module corners 13 at points 53 which anchor the cord. If desired the end walls 48 may have a center rope or cord that can be manually tied to the cord 52 to secure the end walls 48.

The design of FIG. 3 may have a flatter catenary curve of the cord 52 in the center region of the side walls, but nevertheless the curve is effective in holding the cap or cover in place.

Figure 4:
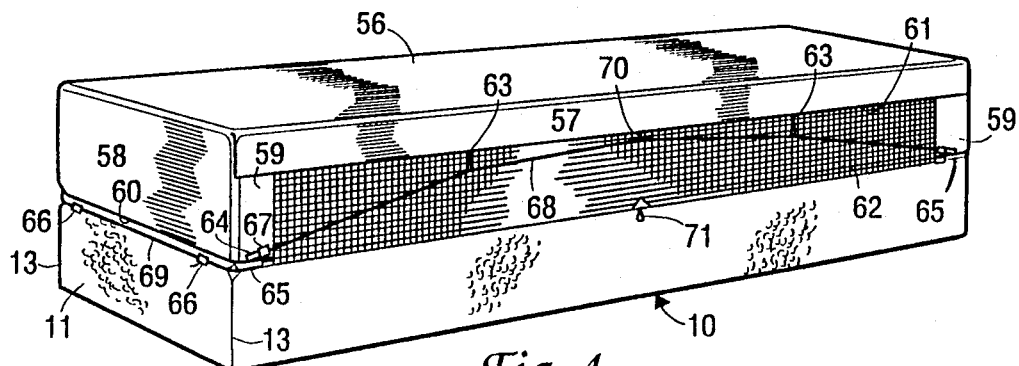
FIG. 4 is a three dimensional view of a modified module cover having mesh in the side walls similar to FIG. 2 but with the bottom edge of the mesh tightened and with my catenary hold down securing the bottom edge of the waterproof sidewall.

Referring to FIG. 4, there is illustrated a cover similar to FIG. 2 in the fabric and mesh components but with a different mode of holding down the cover with a catenary curve. The module 10 has a cover disposed thereon having a horizontal sheet 56 to which are secured short side walls 57 and long end walls 58 all of waterproof material. The end walls 58 have flaps 59 that over lie the side walls of the module. The end walls 58 and flaps 59 have a bottom edge 60. The side walls 57 have a lower edge 61 to which is secured a sheet of mesh 62 and this strip is not sewed to the flaps 59 nor to the end wall 58, but is sewed to the bottom edge 61 in the region of the flaps 59. This non-attachment to the flaps avoids the tearing of the mesh that occurs when the mesh is sewed to the outer vertical edge of the flaps 59. The mesh 62 has a bottom edge 65 that extends an inch or two below the bottom edge 60 of the end walls 58 and flaps 59.

Secured to the bottom edge 61 of each side walls 57 is a center loop 70 and outboard of this loop at approximately the quarter points on the length are two longer loops 63. Sewed, served or otherwise secured to the bottom edge of each flap 59 is a short strap 64 holding a buckle 67. Attached to each buckle 67 is a cord 68 passing through the loops 62 and 63.

Secured to the ends of the bottom edge of the mesh 62 is a strap 65 holding a buckle 66. A strap or webbing 69 is connected to the buckles 66 at each module end to tension the bottom edges of the mesh 62. When the cord system 68 is manually tensioned, the buckles and/or cord bite into the module corner 13 to anchor the cord system. The cord 68 forms a catenary curve with the three loops 70 and 63 to hold the cover tight against winds. Tensioning cord 69 holds the bottom edges of the mesh 62 tight against the module. The lower edge of the mesh 62 may have one or more loops 71 to which a suitable fastener can be secured to also hold the bottom mesh edge.

Figure 5:
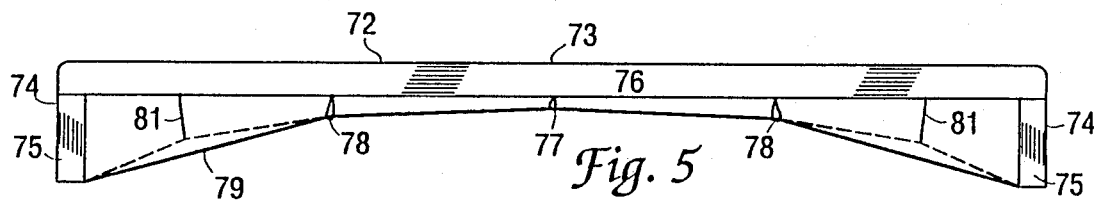
FIG. 5 is an elevation view of a modified form of cover employing my catenary hold down and having manual cords to tie to the catenary cord to tighten it.

Referring now to FIG. 5 there is illustrated a cover 72 generally the same as the cover 15 of FIG. 1. A horizontal sheet 73 has secured to it end pieces 74 with or without flaps 76. Also secured to the top 73 are side walls 76 having secured to its lower edge a short center loop 77 and longer outboard loops 78 at the quarter points. A cord 79 may be secured to the end walls 74 or flaps 76 in any suitable manner and pass through the loops 77 and 78. The structure of FIG. 5 differs from the others in having short cords secured 81 to the bottom edge of the side walls 76 in the outboard quarter of the length of the side wall 76. After the cord 79 is tightened, the operator manually ties these short cords 81 to the main cord 79, pulling it upwardly as shown in broken outline. Not only does this more perfectly approximate a catenary curve, but additionally tensions the main cord 79 and retains more perfectly the end quarters of the cover 72.

FOLDED CORNER CONSTRUCTION

This invention relates to covers for cotton modules and similar objects that are rectangular in plan view and has particular reference to a buckle and grommet combination for tightening girth cord about a cover to hold the cover to the module.

BACKGROUND OF THE INVENTION

Various types of covers are used to protect cotton modules and similar rectangular products or shipments. These are generally waterproof covers with waterproof side walls and end walls to protect the top one eighth to one fourth of the module. This amount of protection is generally sufficient to adequately protect the whole module from rain and the elements.

While many covers are sewed at the corners to provide a tight fitting cap for the module, this sewing is expensive and frequently the fitted corners are too tight or too loose for the object to be protected. For this reason many type covers have been tried that are in the form of a flat sheet of material that is manually folded at the corners of the rectangular object being protected. Various tie down ropes and systems have been devised to hold these folded corners and the cover to the object. The least amount of labor for the tie down system is achieved when a horizontal belt encircles the cover to hold it tightly against the load.

BRIEF SUMMARY OF THE INVENTION

I have devised a flat cover that is manually folded at the corners about a module or other rectangular object. My cover is provided with a strap and grommet combination to manually tighten a girth cord about the cover to hold the cover tightly against the rectangular object. I employ a cover material that is extremely strong in tension such as polyethylene fabric, and I utilize this fabric strength as part of the girth cord. This is done by placing grommets in each corner of the flat rectangular cover, cutting spaced holes along the sides and tying a cord to one grommet and weaving the cord in and out the spaced holes and into the other grommet on each side. This flat rectangular cover with cords on each side is placed over the load and the grommets are folded inside the side wall on each corner and the cords manually tightened and tied off. These grommets pull against the fabric material of the end pieces, and the weaving of the cords in and out the spaced holes causes the lower edge of the cover side wall to be held against the module or other object.

The tightening of the side wall cords does not however, pull the outer flap tight and they are free to open up and tend to lift the corners. The outer corners are tightened by a buckle secured to one end of each side wall and a cord secured at one end to the other side wall. When the cord is manually tightened these outer flaps are held tightly against the cotton module.

BRIEF DESCRIPTION OF THE DRAWINGS

Figure 6:
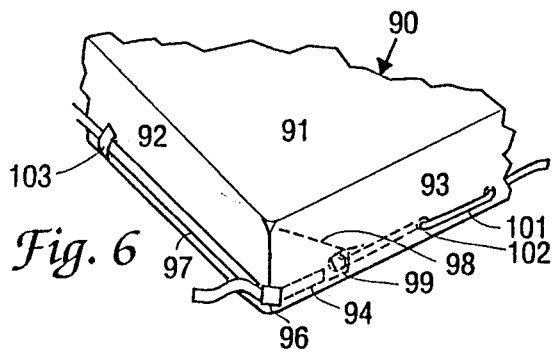
FIG. 6 is a partial three dimensional view of a modified cover having a combination of end straps and side cords woven in and out of holes in the sides.

Referring to the drawings forming an integral part of this specification:

FIG. 6 is a three dimensional view of one corner of a module cover with the grommet flap folded under the side wall and a strap along an end wall.

Figure 7:
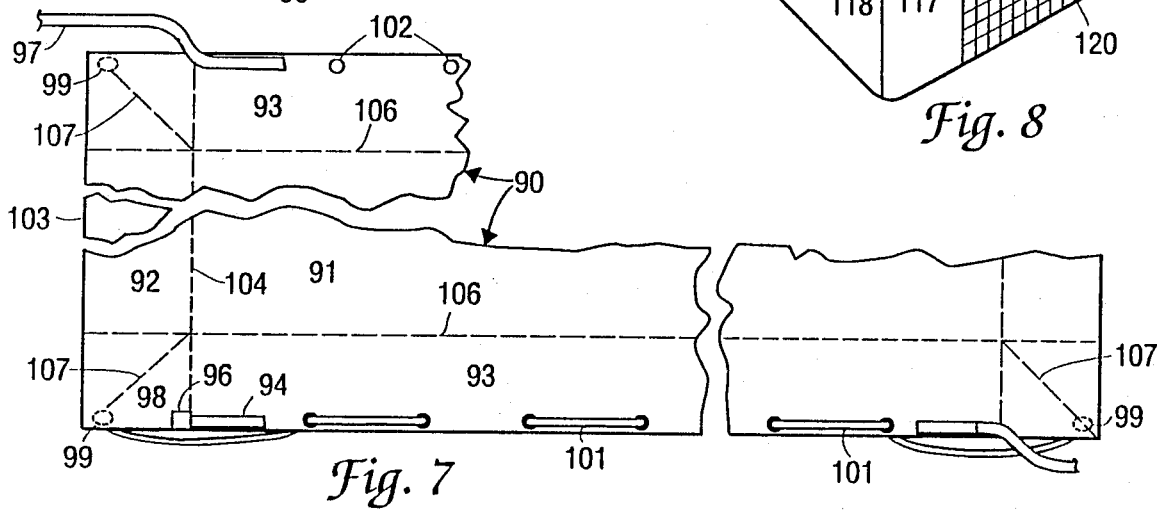
FIG. 7 is a segmented plan view on an enlarged scale of the finished rectangular cover of FIG. 6 that can be folded at the corners to the shape shown in FIG. 6.

FIG. 7 is a segmented plan view on an enlarged scale of the finished rectangular cover of FIG. 6 that can be folded at the corners to the shape shown in FIG. 6.

Figure 8:
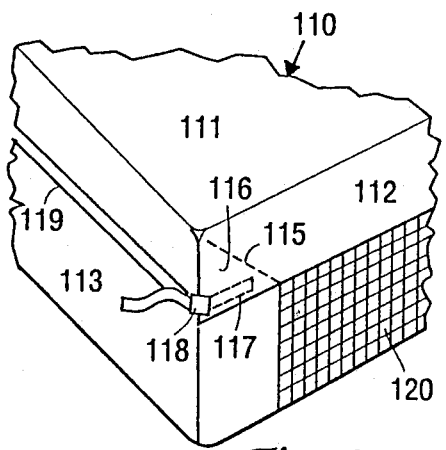
FIG. 8 is a three dimensional view of a modified module cover employing an end cord and buckle to create a girth cord by using the material of the side wall in tension.

FIG. 8 is a three dimensional view of a modified module cover employing an end cord and buckle to create a girth cord by using the tensile strength of the material of the side wall in tension.

DETAILED DESCRIPTION

Referring to FIG. 6 there is illustrated a cover 90 having a horizontal sheet 91 to which are secured end walls 92 and side walls 93. Secured to each side wall at a corner is webbing 94 holding a buckle 96 to which is manually fastened a cord 97 having its other end secured to the opposite side wall in any suitable fashion, for example by serving or by a buckle.

Folded under the end of the side wall 93 is a triangular flap 98 having a grommet 99 formed therein. Tied to the cover at the grommet 99 is a side cord 101 which is woven in and out of holes 102 formed in the lower edge of the side wall 93. The other end of the cord 101 is manually pulled tight against a grommet similar to 99, and tied at the grommet or a buckle or other cord attachment can be used. The end wall 92 may have a loop 103 secured to it so that the end wall 92 will be held down in place by the cord 97 against winds.

Referring now to FIG. 7, there is shown the cover 90 of FIG. 6 in its flat form fully manufactured and ready for use. The cover is folded along a line 104 to form the end wall 92 and is folded along a line 106 to form the side walls 93. The corners are folded along lines 107 to form the inner flap 98. The cord 101 is tied to the left grommet, and is loose in its right grommet. The upper cord is omitted from FIG. 7 to illustrate the holes 102. The wrapping of FIG. 6 is achieved by pulling the cords 101 tight against their right grommet and tying them off. The cords 97 are next tightened, holding the ends of the side walls 93 tight against a module or other object being protected.

While the cords 101 could hold the cover 90 on a module by themselves and the cords 97 could hold the cover on the module by themselves, the greatest holding of the cover is achieved by using both in combination.

Referring to FIG. 8 there is illustrated the structure of FIG. 6 as applied to a cover having mesh partial side walls, but with a hold down structure operating at a different level. A cover 110 has a horizontal sheet 111, waterproof side walls 112 and, end walls 113. The end wall 113 may have twice or three times the vertical dimension of the side wall 112. This is achieved by moving the fold line 104 of FIG. 7 to the right in FIG. 7, and folding the side wall along the line 106 of FIG. 7 and folding the side wall ends along a line 115. This creates an end wall flap 116 at each corner.

Sewed to the bottom edge of the side wall 112 is a strap 117 having a buckle 118 to which an end strap 119 is secured and this tensions the corner flap 116 of side wall 112 to hold it in place. Served to the bottom edge of the side wall 112 is a mesh strip 120. The side wall 112, 120 may be held down by any suitable structure. The strap 119 holds the corner of the side wall against flapping in the wind in addition to holding the cover on the module.

I have described the presently preferred embodiments of my invention as required by the patent statutes. Various modifications and improvements will be obvious to those skilled in the art. All such variations, modifications, and improvements that fall within the true spirit and scope of the invention are included in the scope the following claims.

I claim:

1. For use on a cotton module having side walls, end walls forming corners at the side walls, and a generally horizontal top, the combination of a cover and catenary hold down comprising:
   (a) a horizontal waterproof sheet of approximately the same size as the module top;
   (b) flexible side wall sheets secured to the horizontal sheet to partially overlay the side walls of the module and having a generally horizontal bottom edge;
   (c) at least three loops secured to the bottom edge of each flexible side wall sheet and extending downwardly at least one loop located near the center of each side wall that is shorter than the other loops;
   (d) and a cord passing thru the loops and about the cotton module and disposed at the module end walls below the longest loops, said cord biting into the corners of the module to anchor the cord at the corners and forming a catenary curve along the module side walls to hold down the flexible side walls against wind and other elements.

2. The combination of claim 1 wherein there is added:
   (e) end sheets having tensile strength secured to the horizontal sheet to partially overlie the module ends; and the cord includes the end sheets.

3. The combination of claim 1 wherein there is added:
   (e) end sheets having tensile strength secured to the horizontal sheet to partially overlie the module end walls; and the cord includes a rope like material passing thru the loops on each flexible side wall and connected to the end walls so that the cord includes the end walls;

4. For use on a cotton module having side walls, end walls forming corners at the side walls, and a generally horizontal top, the combination of a cover and catenary hold down comprising:
   (a) a horizontal waterproof sheet of approximately the same size as the module top
   (b) waterproof and flexible side wall sheets secured to the horizontal sheet to partially overlie the side walls of the module and having a generally horizontal bottom edge;
   (c) a vertical side wall sheet of mesh secured to the bottom edge of at least one waterproof side wall sheet and having a generally horizontal bottom edge;
   (d) a plurality of loops secured to the bottom edge of at least one of said waterproof and mesh side wall sheets and extending downwards and the loops near the center being shorter and the other loops being progressively longer toward the ends of the side wall sheet so that the ends of the loops define points along a catenary curve;
   (e) and a cord passing thru the loops and about the cotton module and disposed about the module end walls below the longest loops; said cord biting into the corners of the module to anchor the cord at the corners and forming a catenary curve along the module side walls to hold down the flexible side walls against wind and other elements.

5. The combination of claim 4 wherein the loops are secured to the bottom edge of the waterproof side wall sheet:

6. The combination of claim 4 wherein the loops are secured to the bottom edge of the mesh sheet.

7. In combination with a cotton module having side walls, end walls that intersect the side walls to form module corners, and a generally horizontal top, a cover and hold down comprising:
   (a) a horizontal waterproof sheet of approximately the same size as the module top;
   (b) side wall sheets secured to the horizontal sheet to partially overlie the side walls of the module and having a generally horizontal bottom edge;
   (c) a plurality of loops secured to the bottom edge of each flexible sidewall sheet and at least one loop located near the center of each sidewall that is shorter than the other loops and the loops extending downwardly;
   (d) and a cord passing thru the loops and about the cotton module and disposed at the module ends below the bottom of the longest loop, said cord biting into the corners of the module to anchor the cord at the corners and forming a catenary curve along the module side walls to hold down the flexible side walls against wind and other elements.

8. A cover for use on a cotton module comprising:
   (a) a horizontal waterproof sheet having sides;
   (b) vertical side wall sheets secured to the sides of the horizontal sheet, and each having a horizontal lower edge and having ends;
   (c) a plurality of loops secured to the lower edge of each side wall sheet and the loops near the center being the shortest and the other loops being progressively longer toward the ends of the vertical sidewall sheets so that the lower ends of the loops define points along a catenary curve.

9. For use on a cotton module having side walls, end walls forming corners at the side walls, and a generally horizontal top, the combination of a cover and catenary hold down comprising:
   (a) a horizontal waterproof sheet of approximately the same size as the module top;
   (b) side walls sheets secured to the horizontal sheet to partially overlie the side walls of the module and having a generally horizontal bottom edge having end quarters;
   (c) a plurality of loops secured to the bottom edge of each flexible sidewall sheet and at least one loop located near the center of each sidewall that is shorter than the other loops;
   (d) a cord passing thru the loops and about the cotton module and disposed below the bottom edge of the flexible side walls,
   (e) and ties connected to the bottom edge of the side wall sheets at the end quarters and of length to engage the cord, said cord biting into the corners of the module to anchor the cord at the corners and forming a catenary curve along the module side walls to hold down the flexible side walls against wind and other elements, said ties tensioning the cord when manually tied to the cord with an upward pull.

* * * * *